US010767098B2

(12) United States Patent
Doan et al.

(10) Patent No.: US 10,767,098 B2
(45) Date of Patent: Sep. 8, 2020

(54) METHOD OF USING SIZED PARTICULATES AS SPACER FLUID

(71) Applicant: Baker Hughes Incorporated, Houston, TX (US)

(72) Inventors: Angela Anh Doan, Houston, TX (US); Matthew Grady Kellum, Spring, TX (US); Li Li, Spring, TX (US); Shailesh S. Dighe, Katy, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 527 days.

(21) Appl. No.: 15/000,892

(22) Filed: Jan. 19, 2016

(65) Prior Publication Data
US 2016/0130495 A1    May 12, 2016

Related U.S. Application Data

(63) Continuation-in-part of application No. 14/665,977, filed on Mar. 23, 2015, which is a continuation-in-part of application No. 14/029,520, filed on Sep. 17, 2013.

(51) Int. Cl.
C09K 8/40     (2006.01)
E21B 33/14    (2006.01)

(52) U.S. Cl.
CPC ............... C09K 8/40 (2013.01); E21B 33/14 (2013.01)

(58) Field of Classification Search
CPC ...................................................... C09K 8/40
See application file for complete search history.

(56) References Cited

U.S. PATENT DOCUMENTS

| | | |
|---|---|---|
| 2,629,667 A | 2/1953 | Kaveler |
| 3,132,693 A | 5/1964 | Weisend |
| 3,465,825 A | 9/1969 | Hook et al. |
| 3,551,133 A | 12/1970 | Sprayberry et al. |
| 3,974,077 A | 8/1976 | Free |
| 4,040,967 A | 8/1977 | Nimerick et al. |
| 4,048,077 A | 9/1977 | Englehardt et al. |
| 4,083,407 A | 4/1978 | Griffin, Jr. et al. |
| 4,105,461 A | 8/1978 | Racciato |
| 4,240,840 A | 12/1980 | Downing et al. |
| 4,309,523 A | 1/1982 | Engelhardt et al. |
| 4,480,693 A | 11/1984 | Newlove et al. |
| 4,525,515 A | 6/1985 | Peignier |
| 4,568,471 A | 2/1986 | Defosse |
| 4,587,283 A | 5/1986 | Hille et al. |
| 4,784,693 A | 11/1988 | Kirkland et al. |
| 4,880,870 A | 11/1989 | Zimmermann |
| 4,888,059 A | 12/1989 | Yamaguchi et al. |
| 4,892,589 A | 1/1990 | Kirkland |
| 4,941,536 A | 7/1990 | Brothers et al. |
| 5,003,060 A | 3/1991 | Vinot |
| 5,020,598 A | 6/1991 | Cowan et al. |
| 5,030,366 A * | 7/1991 | Wilson ............ C04B 24/28 166/291 |
| 5,105,885 A | 4/1992 | Bray et al. |
| 5,116,421 A | 5/1992 | Ganguli |
| 5,184,680 A | 2/1993 | Totten et al. |
| 5,372,732 A | 12/1994 | Harris et al. |
| 5,421,881 A | 6/1995 | Rodrigues et al. |
| 5,447,197 A | 9/1995 | Rae et al. |
| 5,448,991 A | 9/1995 | Poison et al. |
| 5,464,060 A | 11/1995 | Hale et al. |
| 5,547,506 A | 8/1996 | Rae et al. |
| 5,613,558 A | 3/1997 | Dillenbeck, III |
| 5,658,380 A | 8/1997 | Dillenbeck, III |
| 5,739,212 A | 4/1998 | Wutz et al. |
| 5,795,924 A | 8/1998 | Chatterji et al. |
| 6,145,591 A | 11/2000 | Borman et al. |
| 6,165,947 A | 12/2000 | Chang et al. |
| 6,227,294 B1 | 5/2001 | Chatterji et al. |
| 6,235,809 B1 | 5/2001 | Di Lullo Arias et al. |
| 6,376,580 B1 | 4/2002 | Ikuta et al. |

(Continued)

FOREIGN PATENT DOCUMENTS

EP    0572261 A1    12/1993
EP    0592217 A2    4/1994
(Continued)

OTHER PUBLICATIONS

A. Brandl, G.G. Narvaez, W.S. Bray; "New Slurry Design Concepts Using Multifunctional Additives to Improve Duality and Sustainability of Cementing Systems for Zonal Isolation"; SPE 161352; Oct. 2012; 10 pgs; Society of Petroleum Engineers; Lexington, Kentucky.

B.R. Reddy, Rahul Patil, Sandip Patil; "Chemical Modification of Biopolymers to Design Cement Slurries with Temperature-Activated Viscosification"; SPE 141005; Apr. 2011; 11pgs; Society of Petroleum Engineers; The Woodlands, Texas.

P.A. Sanford, J. Baird, I.W. Cottrell; "Xanthan Gum with Improved Dispersibility"; Apr. 21, 1981; vol. 150; 11 pages ; American Chemical Society, San Diego, CA.

Gino G. Di Lullo Arias; "Chemically Modified Polyvinyl Alcohols for Use as Cement Fluid Loss and Gas Control Additive"; Brazilian Application No. PI0904873; Apr. 19, 2011; 34 pages; Verified English Translation.

(Continued)

Primary Examiner — Andrew Sue-Ako
(74) Attorney, Agent, or Firm — John Wilson Jones; Jones Delflache LLP

(57) ABSTRACT

A spacer fluid contains one or more hydratable polymeric viscosifying agents having a particle size distribution such that a minimum of 90% of the particulates are retained on a 20 mesh screen. The spacer fluid may further contain one or more surfactants, viscosity thinners, organic solvents, weighting materials, suspending agents and antifoaming agents. The spacer fluid may be used to position a first fluid into a wellbore annulus of a wellbore containing a second fluid. The spacer fluid may further be used to fluidly isolate at least a portion of a wellbore annulus in a wellbore containing an oil-based drilling mud and an aqueous cement slurry.

20 Claims, No Drawings

(56) References Cited

U.S. PATENT DOCUMENTS

| | | |
|---|---|---|
| 6,444,747 B1 | 9/2002 | Chen et al. |
| 6,465,587 B1 | 10/2002 | Bair et al. |
| 6,489,270 B1 | 12/2002 | Vollmer et al. |
| 6,590,050 B1 | 7/2003 | Bair et al. |
| 6,591,910 B1 | 7/2003 | Chatterji et al. |
| 6,617,446 B1 | 9/2003 | Papadopoulos et al. |
| 6,770,604 B2 | 8/2004 | Reddy et al. |
| 6,832,652 B1 | 12/2004 | Dillenbeck et al. |
| 6,869,998 B2 | 3/2005 | Bair et al. |
| 6,907,928 B2 | 6/2005 | Di Lullo Arias et al. |
| 6,978,835 B1 | 12/2005 | Reddy et al. |
| 7,007,754 B2 | 3/2006 | Fanguy, Jr. et al. |
| 7,021,380 B2 | 4/2006 | Caveny et al. |
| 7,137,448 B2 | 11/2006 | Di Lullo Arias et al. |
| 7,144,844 B2 | 12/2006 | Qu et al. |
| 7,220,709 B1 | 5/2007 | Qu et al. |
| 7,271,214 B2 | 9/2007 | Bair et al. |
| 7,303,018 B2 | 12/2007 | Cawiezel et al. |
| 7,392,844 B2 | 7/2008 | Berry et al. |
| 7,448,449 B2 | 11/2008 | Di Lullo Arias et al. |
| 7,510,009 B2 | 3/2009 | Cawiezel et al. |
| 7,631,541 B2 | 12/2009 | Waugh et al. |
| 7,967,909 B2 | 6/2011 | Lopez et al. |
| 8,096,359 B2 | 1/2012 | Bray |
| 8,596,356 B2 | 12/2013 | Brandi et al. |
| 8,636,068 B2 | 1/2014 | Vorderbruggen et al. |
| 8,689,870 B2 | 4/2014 | Bray et al. |
| 9,506,317 B2 | 11/2016 | Craig et al. |
| 2003/0120027 A1 | 6/2003 | Valls et al. |
| 2004/0168804 A1 | 9/2004 | Reddy et al. |
| 2005/0009959 A1 | 1/2005 | Bair et al. |
| 2005/0113264 A1 | 5/2005 | Vollmer |
| 2005/0139130 A1 | 6/2005 | Partain, III et al. |
| 2006/0199742 A1 | 9/2006 | Arisz et al. |
| 2006/0205605 A1 | 9/2006 | Dessinges et al. |
| 2006/0254770 A1* | 11/2006 | Hou .................. C09K 8/52 166/291 |
| 2006/0272735 A1 | 12/2006 | Pessin et al. |
| 2007/0135312 A1 | 6/2007 | Melbouci |
| 2007/0015249 A1 | 7/2007 | Lin |
| 2008/0066652 A1 | 3/2008 | Fraser et al. |
| 2008/0066654 A1 | 3/2008 | Fraser |
| 2008/0066655 A1 | 3/2008 | Fraser |
| 2009/0044726 A1 | 2/2009 | Brouillette et al. |
| 2009/0082230 A1 | 3/2009 | Javora et al. |
| 2009/0149353 A1 | 6/2009 | Dajani et al. |
| 2009/0156436 A1 | 6/2009 | Drochon |
| 2010/0224366 A1 | 9/2010 | Lende et al. |
| 2011/0053813 A1 | 3/2011 | Panga et al. |
| 2011/0312858 A1 | 12/2011 | Holt |
| 2012/0090841 A1 | 4/2012 | Reddy |
| 2012/0138300 A1 | 6/2012 | Bray |
| 2012/0305250 A1* | 12/2012 | Burts, Jr. .................. C04B 26/28 166/292 |
| 2013/0000904 A1 | 1/2013 | Scoggins |
| 2013/0153222 A1 | 6/2013 | Pisklak et al. |
| 2014/0000893 A1 | 1/2014 | Lewis et al. |
| 2015/0075792 A1 | 3/2015 | Brandl et al. |
| 2015/0198010 A1 | 7/2015 | Doan et al. |
| 2015/0204161 A1 | 7/2015 | Craig et al. |

FOREIGN PATENT DOCUMENTS

| | | |
|---|---|---|
| EP | 0659702 A1 | 6/1995 |
| EP | 1175378 B1 | 1/2002 |
| FR | 993586 | 11/1951 |
| WO | 1999016723 | 4/1999 |
| WO | 2000063134 | 10/2000 |
| WO | 2002046253 A2 | 6/2002 |
| WO | 2003031365 A1 | 4/2003 |
| WO | 2016154363 A1 | 9/2016 |

OTHER PUBLICATIONS

Gunnar DeBruijn et al; High-Pressure, High Temperature Technologies, Schlumberger Oilfield Review, Autumn 2008, p. 46-60.

* cited by examiner

METHOD OF USING SIZED PARTICULATES AS SPACER FLUID

This application is a continuation-in-part of U.S. patent application Ser. No. 14/665,977, filed on Mar. 23, 2015 which is a continuation-in-part of U.S. patent application Ser. No. 14/029,520, filed on Sep. 17, 2013, both of which are herein incorporated by reference.

FIELD OF THE DISCLOSURE

The disclosure relates to a spacer fluid containing hydratable particulates having a minimum of 90% retention on a 20 mesh screen. The hydratable particulates enhance the stability of the fluid at elevated bottomhole temperatures. The spacer fluid is compatible with oil-based fluids and water-based fluids. The spacer fluid may be used in separating a drilling mud from an aqueous cement slurry.

BACKGROUND OF THE DISCLOSURE

Drilling fluids (often referred to as "muds") are normally present in wells which penetrate a subterranean reservoir at the time of cementing a casing into the wellbore with an aqueous cement slurry. The intermingling of the drilling mud and aqueous cement slurry can create emulsions (water-in-oil as well as oil-in-water emulsions). Such emulsions resist fluid movement upon the application of force and raise the viscosity profile of the wellbore fluid.

Direct contact between an aqueous based cement slurry and the drilling mud often jeopardizes the cementing operation as well as the integrity of the wellbore. Diffusion of ionic species from the drilling mud may cause premature setting of the cement slurry. The ramifications of early cement hardening include equipment damage, wellbore damage and possible loss of tubular strings. Further, components within the drilling mud may detrimentally affect the cementing operation. For instance, flocculation of weighting agents in the drilling mud may reduce the compressive strength of the set cement.

Since the drilling mud and aqueous cement slurry are often not compatible with each other, it is often desirable to separate or prevent contact between them by use of a spacer fluid. The spacer fluid further improves displacement of at least a portion of the drilling mud from an area in the wellbore into which the cement slurry is to be emplaced. In order to be effective, the spacer fluid must be compatible with the mud and the cement slurry. This compatibility must exist at downhole temperatures and pressures.

In addition to improving displacement efficiency of the drilling mud by separating the mud from a physically incompatible fluid, spacer fluids can further enhance solids removal.

The spacer fluid is also useful for separating different drilling muds during drilling mud change outs and for separating a drilling mud and an aqueous fluid (including a completion brine or seawater) during well integrity testing. In some instances, it is also desirable for the spacer fluid to water-wet the surfaces of the wellbore to promote bonding of the cement sheath to the wellbore and casing.

Rheological properties of the spacer fluid are often an important factor in the selection of a suitable spacer fluid. Typically, conventional spacer fluids do not exhibit the requisite rheology and are unable to provide desirable displacement of the mud at elevated downhole temperatures due to thermal thinning of the fluid. Alternative spacer fluids are therefore needed especially for use at elevated downhole temperature conditions.

It should be understood that the above-described discussion is provided for illustrative purposes only and is not intended to limit the scope or subject matter of the appended claims or those of any related patent application or patent. Thus, none of the appended claims or claims of any related application or patent should be limited by the above discussion or construed to address, include or exclude each or any of the above-cited features or disadvantages merely because of the mention thereof herein.

SUMMARY OF THE DISCLOSURE

In an embodiment of the disclosure a spacer fluid is provided for separating a drilling mud and an aqueous cement slurry in a wellbore. The spacer fluid comprises particulates of one or more hydratable polymeric viscosifying agents. The size distribution of the particulates is such that a minimum of 90% of the particulates are retained on a 20 mesh screen.

In another embodiment of the disclosure, a method of separating an aqueous cement slurry from a drilling mud in a wellbore is provided. In this method, a spacer fluid having particulates of one or more hydratable polymeric viscosifying agents is introduced into the wellbore after drilling. The spacer fluid is introduced into the wellbore before introducing the aqueous cement slurry into the wellbore. The particle size distribution of the polymeric viscosifying agent(s) is such that a minimum of 90% of the particulates are retained on a 20 mesh screen.

In another embodiment of the disclosure, a method of emplacing an aqueous cement slurry into a wellbore containing a drilling mud is provided. In this embodiment, a spacer fluid having particulates of at least one hydratable polymeric viscosifying agent is introduced into the wellbore which contains the drilling mud. The particle size distribution of the polymeric viscosifying agents is such that a minimum of 90% of the particulates are retained on a 20 mesh screen. The spacer fluid displaces at least a portion of the drilling mud from an area in the wellbore into which the cement slurry is to be emplaced. At least a portion of the spacer fluid is displaced from the area in the wellbore with the aqueous cement slurry. The cement slurry is then hardened.

Characteristics and advantages of the present disclosure described above and additional features and benefits will be readily apparent to those skilled in the art upon consideration of the following detailed description of various embodiments and referring to the accompanying drawings.

DETAILED DESCRIPTION OF THE PREFERRED EMBODIMENTS

Characteristics and advantages of the present disclosure and additional features and benefits will be readily apparent to those skilled in the art upon consideration of the following detailed description of exemplary embodiments of the present disclosure. It should be understood that the description herein, being of example embodiments, are not intended to limit the claims of this patent or any patent or patent application claiming priority hereto. On the contrary, the intention is to cover all modifications, equivalents and alternatives falling within the spirit and scope of the claims.

Many changes may be made to the particular embodiments and details disclosed herein without departing from such spirit and scope.

As used herein and throughout various portions (and headings) of this patent application, the terms "disclosure", "present disclosure" and variations thereof are not intended to mean every possible embodiment encompassed by this disclosure or any particular claim(s). Thus, the subject matter of each such reference should not be considered as necessary for, or part of, every embodiment hereof or of any particular claim(s) merely because of such reference.

Certain terms are used herein and in the appended claims to refer to particular elements and materials. As one skilled in the art will appreciate, different persons may refer to an element and material by different names. This document does not intend to distinguish between elements or materials that differ in name. Also, the terms "including" and "comprising" are used herein and in the appended claims in an open-ended fashion, and thus should be interpreted to mean "including, but not limited to . . . ." Further, reference herein and in the appended claims to elements and components and aspects in a singular tense does not necessarily limit the present disclosure or appended claims to only one such component, materials or aspect, but should be interpreted generally to mean one or more, as may be suitable and desirable in each particular instance.

The spacer fluid described herein contains one or more hydratable polymeric viscosifying agents. The particle size distribution of the hydratable polymeric viscosifying agent (s) is such that a minimum of 90% of the particulates are retained on a 20 mesh screen.

The spacer fluid may be used to separate a drilling mud and an aqueous cementitious slurry in a wellbore.

The presence of the sized hydratable polymeric viscosifying agent(s) in the spacer fluids provides stability and long-term fluidity to the fluid. The enhanced stability enables the spacer fluid to be used at elevated bottomhole temperatures. In an embodiment, the spacer fluid is stable and may be used at a bottom hole temperature 300° F. and higher. In another embodiment, the spacer fluid is stable and may be used at a bottom hole temperature of 400° F. and higher.

The hydratable polymeric viscosifying agents used in the spacer fluids described herein exhibit delayed viscosification such that the spacer fluid may be pumped downhole and the fluid viscosified after reaching its targeted location within the well.

Unlike conventional spacer fluids which are too unstable for use in horizontal wells, the presence of the coarse particulates further provides stability to the fluids disclosed herein for use in horizontal wells. In addition to horizontal wells, the spacer fluids disclosed herein may be used in vertical wells as well as deviated wells.

In a preferred embodiment, the coarse particulates of the hydratable polymeric viscosifying agent(s) are composed of cellulosic derivatives, polyvinyl alcohol or an ammonium or alkali metal salt of an acrylamidomethylpropanesulfonic acid as well as mixtures thereof.

Preferred cellulosic derivatives include hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof. Hydroxyethyl cellulose is especially preferred.

The polymeric hydratable viscosifying agent as disclosed herein may be crosslinkable or non-crosslinkable and may be considered as a thickening polymer which is hydratable to form a linear or crosslinked gel. In addition to the cellulosic derivatives set forth above, the polymeric hydratable viscosifying agents may include galactomannan gums, guars, derivatized guars, starch, starch derivatives, xanthan, derivatized xanthan and mixtures thereof.

Galactomannan gums include underivatized guar, derivatized guars like hydroxypropyl guar (HPG), carboxymethyl hydroxypropyl guar (CMHPG).

Further examples of polymeric hydratable viscosifying agent(s) also include phosphomannans, scleroglucans, dextrans, starch, starch derivatives, xanthan, derivatized xanthan and mixtures thereof, locust bean gum, welan gum, karaya gum, xanthan gum, diutan, etc.

In an embodiment, the viscosifying agent comprising the polymeric hydratable viscosifying agent may be adsorbed onto a water-insoluble adsorbent. Suitable water-insoluble adsorbents include minerals, fibers, ground almond shells, ground walnut shells, ground coconut shells, activated carbon, activated coals, silica particulates, precipitated silicas, silica, alumina, silica-alumina, calcium silicate, bauxite, kaolin, talc, zirconia, boron and glass, fly ash, zeolites, diatomaceous earth, ground walnut shells, fuller's earth and organic synthetic high molecular weight water-insoluble adsorbents, and clays and mixtures thereof. The weight ratio of polymeric hydratable viscosifying agent to water-insoluble adsorbent is typically between from about 90:10 to about 10:90. In a particularly preferred embodiment, the viscosifying agent is an ammonium or alkali metal salt of an acrylamidomethylpropanesulfonic acid adsorbed onto a water-insoluble adsorbent.

The coarser (or large particle sized) polymeric hydratable viscosifying agent(s) may have a relatively small surface area per weight of the polymer in comparison to viscosifying agent(s) of smaller particle size.

The sized polymeric viscosifying agents may be included in the spacer fluid in an amount sufficient to provide, for example, the desired rheological properties. Typically, the amount of hydratable polymeric viscosifying agent(s) employed is between from about 15 to about 50, preferably from about 20 to about 30, pounds per 1,000 gallons of water in the spacer fluid.

The density of the spacer fluid is dependent upon well conditions, most specifically, the density of the mud in the wellbore at the time of cementation. It is preferable, but not essential, that the spacer fluid introduced into the wellbore have a density at least equal to or greater than the density of the drilling mud and less than or equal to the density of the cementitious slurry to be introduced into the wellbore. The higher density spacer fluid pushes gelled and solid remnants of the displaced fluid away from the wellbore wall and fluid conduit exteriors. In an embodiment, the cement spacer may be characterized by a density ranging from about 8 to about 24 lb/gal, more preferably from about 14 to about 20 lb/gal, and most preferably about 16 to 20 lb/gal.

The spacer fluid may contain one or more weighting agents to increase the density of the fluid to the density profile between the fluids it is separating and to prevent fluid inversion with other fluids in the wellbore. The weighting agent also assists with increasing the buoyancy effect of the spacer fluid on gelled drilling muds and filter cake. The weighting agent may be part of the spacer fluid introduced into the wellbore or may be applied subsequent to the introduction of the spacer fluid into the wellbore.

The sized polymeric viscosifying agents serve as rheology modifiers to the fluid and allow formulation of a spacer fluid with desirable rheological properties. For instance, delayed hydration of the sized polymeric viscosifying agents enables the weighting agent to remain suspended in the fluid at higher temperatures.

Weighting agents that can be utilized are preferably insoluble in water and liquid hydrocarbons and include sand, barite, hematite, fly ash, calcium carbonate, silica sand, ilmenite, manganese oxide, trimanganese tetraoxide, iron oxide, and fly ash and the like. Barite is especially preferred.

The weighting agent is employed in an amount sufficient to provide the desired density of the storable cement spacer system. The weighing agent is present in the spacer fluid by weight per barrel of base aqueous solution in the spacer fluid. Typically, the weighting agent is present in the spacer fluid in a range of from about 100 pounds to about 400 pounds per barrel of base aqueous fluid.

The inclusion of the sized hydratable polymeric viscosifying agents in the spacer fluids defined herein further minimizes undesired thermal thinning.

The spacer fluid is typically aqueous based. The water used in the spacer fluid may include, for example, freshwater, salt water, brine, seawater, deionized water, tap water, natural brackish water, and other potable and non-potable waters containing one or more dissolved salts, minerals or organic materials or any combination thereof. The water is included in an amount sufficient to form a pumpable spacer fluid. In some embodiments, the water may be included in the spacer fluid in an amount in the range of about 15% to about 95% by weight of the spacer fluid. In other embodiments, the water may be included in the spacer fluid in an amount of about 25% to about 85% by weight of the spacer fluid. Typically, the amount of water in the spacer fluid is dependent on the desired density of the fluid.

The spacer fluid composition may further include a gellant. The gellant may induce rheological properties (i.e., thickening) in the spacer fluid that supports particle suspension and helps to prevent losses into the other fluids or the formation. The gellant may include biological polymers, clays, ethoxylated alcohols and polyether glycols. Biological polymers and their derivatives include polysaccharides, including xanthan gums, welan gums, guar gums, cellulose gums, corn, potato, wheat, maize, rice, cassava, and other food starches, succinoglycan, carrageenan, and scleroglucan and other intracellular, structural and extracellular polysaccharides. Biological polymers also include chemically modified derivatives such as carboxymethyl cellulose, polyanionic cellulose and hydroxyethy 1 cellulose (HEC) and forms of the polymers suspended in solvents. Clays and their derivatives include bentonite, sepiolite, attapulgite, and montmorillionite. Polyalklyene glycols include polyethylene glycols and polypropylene glycols, which are macromolecules with a series of internal ether linkages. Polyalklyene glycols are capable of dissolving in water and have a greater impact on viscosity with higher molecular weight.

The spacer fluid may contain one or more other components to secondarily supplement desirable properties of the spacer fluid. When present, the amount of any of such components may be in the range of from about 0.05% to about 1%, more typically between about 0.2 and about 0.5%, and most typically about 0.3%, by weight.

For instance, the spacer fluid may contain an antifoaming agent to prevent the formation of foams and emulsions between the aqueous and hydrocarbon-based fluids by lowering the surface tension between the materials. In particular, antifoaming agents may reduce surface tension and prevent emulsions from forming between the aqueous spacer fluid and hydrocarbons in the drilling mud and in the wellbore interior. Suitable antifoaming agents may include polysiloxanes, paraffinic oils, mineral oils, vegetable oils as well as combinations thereof.

The spacer fluid may contain a suspension agent in order to maintain the fluid with minimal separation over time and to impart the requisite viscosity to the fluid to allow weighting particles to remain suspended over a period of time. Typically, the suspension agent is hydrated in water for a time sufficient to obtain the desired viscosity of the solution. Suitable suspending agents may include starch, succinoglycan, polyethylene oxide, oil in water emulsions created with paraffin oil and stabilized with ethoxylated surfactants, carrageenan, etc.

The spacer fluid may further include a surfactant and/or solvent to enhance the chemical compatibility of the spacer fluid with the oil-based fluid and/or to control the fluidity of the spacer fluid. The surfactant may be used to water-wet both the wellbore wall and exposed surfaces in the wellbore interior by removing non-aqueous materials. This enhances the capability of the cement to adhere to the surfaces. The surfactant also interacts with hydrocarbon-coated solids to suspend them in the aqueous solution for transport out of the wellbore.

The surfactant(s) should be soluble in the spacer fluid and not precipitate. Typically, the surfactants used are water compatible surfactants.

The surfactant may be either anionic or non-ionic and is usually chosen based on the carrier of the spacer fluid as well as the wellbore fluid. Inclusive of preferred surfactants are alkanol amides, ethoxylated alkylarylsulfonates, amine oxides, ethoxylated amines, ethoxylated amides, sulfates and sulfonates of ethoxylated alcohols, ethoxylated alkyl phenols, sulfates or sulfonates of ethoxylated alkyl phenols (and their salts), ethoxylated quaternary ammonium chlorides, fluorocarbon-based surfactants, sulfates or sulfonates of alkanols, coco fatty betaines, condensation products of ethylene oxide and glycols, such as propylene glycol, sulfonated alkyl aldehyde condensates, such as sulfonated naphthalene formaldehyde condensates, sulfonated ketone/acetone formaldehyde condensates, melamine formaldehyde derivatives such as melamine formaldehyde-sodium bisulfite, sulfonated styrene maleic anhydride copolymers, polyacrylamides, such as polyacrylamide dimethylaminoethyl methacrylate copolymer, sulfonated ketone. Especially preferred are nonylphenol ethoxylates, cocoamido betaine, blends of N-alkyl coco trimethyl ammonium chloride and bis(2-hydroxyethyl)cocoamide oxide, blends of ethoxylated trimethylnonanol and perfluoro quaternary ammonium oxide, $C_{12}$-$C_{15}$ linear alcohol ethoxylated sulfate, $C_9$-$C_{11}$ linear alcohol ethoxylated sulfates, sodium lauryl sulfate and ethoxy alcohol sulfates. Preferred solvents include limonene, pinene and carotene, ketones such as acetone and ethylmethyl ketones and ethers such as ethylene glycol monobutyl ether.

Further, the spacer fluid may contain a thinning agent for reducing flow resistance and gel development by reducing viscosity of the spacer fluid. For instance, the thinning agent may reduce the flow resistance and gel development of a filter cake. Functional groups on the thinning agents may act to emulsify oils and hydrocarbons present in the aqueous phase. Thinning agents may also be used in the spacer fluid to attract solids and particles and disperse such particles; the dispersion of particles preventing any increase in viscosity of the spacer fluid due to aggregation. The thinning agent may further interact with charged particles in the wellbore fluid to suspend them for removal from the wellbore. Thinning agents, which are ionic, can further counter-act the effects of cement slurry intrusion into the aqueous spacer. (Cement intrusion in the spacer fluid composition can result in greater saline concentration or higher pH, which in turn can cause the gel strength or the yield point value, or both, of the spacer fluid to rise.) Suitable thinning agents include tannins, lignins, and humic acids, It may further be desirable to add a clay stabilizer to the storable cement spacer system. Suitable stabilizers include salts such as KCl and $NH_4Cl$, or modified salts such as those of quaternary ammonium chloride.

A wide variety of additional additives may also be included in the spacer fluid as deemed appropriate by one skilled in the art, with the benefit of this disclosure. Examples of such additives include free water control additives, fluid loss control additives, lost circulation materials, filtration control additives, dispersants, defoamers, corrosion inhibitors, scale inhibitors, formation conditioning agents, etc.

The spacer fluid may be formed by blending the sized polymeric viscosifying agent(s) and any of the components referenced herein into the aqueous base fluid. Blending means can include mixing using a low- or high-shear blender. Batch mixing of the components may proceed until homogeneous incorporation and formation of the space fluid is obtained. Further, the spacer fluid may be prepared on the fly.

The spacer fluid may be used to displace a first fluid within the wellbore. The spacer fluid positioned thus prevents negative direct interactions between incompatible fluids in the wellbore. The amount of spacer fluid introduced into the wellbore may displace an equivalent amount of first fluid in the wellbore. The spacer fluid induces laminar fluid circulation of the first fluid in the wellbore through the wellbore annulus. The spacer fluid typically fluidly contacts a portion of the tubular exterior surface and a portion of the wellbore wall of the annulus. The spacer fluid contacting the surfaces makes both surfaces water-wet.

The spacer fluid defined herein may also be used to separate fluids in the wellbore. In this embodiment, the spacer fluid may be introduced into the wellbore having a first fluid disposed therein. A second fluid may be introduced into the wellbore with the spacer fluid separating the first fluid and the second fluid.

In an embodiment, the first fluid displaced by the spacer fluid comprises a drilling mud. The drilling mud fills the interior of the wellbore as the wellbore fluid. By way of example, the spacer fluid may be used to displace at least a portion of the drilling mud from the wellbore. The spacer fluid thus may couple to the drilling mud in the wellbore.

Suitable drilling muds are petroleum-based (oil-based muds) as well as water-based materials. Examples of suitable base petroleum materials include crude oils, distilled fractions of crude oil, including diesel oil, kerosene and mineral oil, and heavy petroleum refinery liquid residues. A minor part of the oil-based mud is typically water or an aqueous solution that resides internally in the continuous petroleum phase. Oil-based muds may also include synthetic oil-based muds (typically crude oil derivatives that have been chemically treated, altered or and refined to enhance certain chemical or physical properties). Examples of synthetic oil-based muds include linear alpha olefins, isomerized olefins, poly alpha olefins, linear alkyl benzenes and vegetable and hydrocarbon-derived ester compounds.

In a preferred operation, the spacer fluid may be pumped down the wellbore and up through the annulus between the casing and the formation face to remove at least a portion of the drilling mud therefrom. The wellbore annulus forms between the external surface of the tubular (having an internal fluid conduit and an external surface) and the wellbore wall. The internal fluid conduit fluidly couples the surface with the wellbore. The water-based cement slurry then cures into a solid cement material and is isolated from the first fluid. The spacer fluid thus isolates at least a portion of the wellbore annulus in the wellbore containing the drilling mud using the aqueous cement slurry.

In an alternative operation, introduction of the spacer fluid into the wellbore may occur through a first fluid conduit. The amount of spacer fluid introduced may be at a pressure adequate to induce laminar fluid circulation in the wellbore fluid such that it displaces an equivalent amount of wellbore fluid (mud) through a second fluid conduit. The introduced spacer fluid contacts the wellbore fluid in the wellbore. Introduction of the aqueous cement slurry may occur through the first fluid conduit. The aqueous cement slurry induces laminar fluid circulation in the wellbore, contacts the spacer fluid and displaces an equivalent amount of the fluid in the wellbore. Positioning the aqueous slurry in the wellbore annulus occurs such that the cement slurry contacts both the tubular external surface and the wellbore wall. Maintaining the position of the aqueous cement slurry permits the cement to adhere to the water-wet surfaces of the wellbore wall and tubular exterior. It also permits the wellbore conditions to induce curing in the cement. Upon curing, the aqueous cement slurry forms a solid cement material in the wellbore annulus, fluidly isolating at least a portion of the wellbore annulus.

The cement slurry then may be followed by an additional volume of the spacer fluid. The spacer fluid is introduced into the wellbore in an amount sufficient to separate the drilling mud from the cement slurry. As the spacer fluid is circulated through the wellbore, it mixes with the drilling mud. Before the drilling mud is completely removed from the area to be cemented, there may be some mixing of the drilling mud, spacer fluid and cement slurry. However, the spacer fluid will not harden, gelatinize or otherwise become immobile because of the commingling of the three components.

The cement of the cement slurry may be any conventional cement used in the art in the cementing of wells. Such cements include those comprising calcium, aluminum, silicon, oxygen, iron, and/or sulfur, which set and harden by reaction with water as well as hydraulic cements such as Portland cements, pozzolan cements, gypsum cements, high alumina content cements, slag cements, silica cements as well as combinations thereof.

The spacer fluid may also remove the drilling mud, dehydrated/gelled drilling mud, and/or filter cake solids from the wellbore in advance of the cement composition. Cementing in the presence of filter cake can cause a cementing job to fail. The adhesion of filter cake and gelled fluid to the well bore wall or the tubular exterior is weak compared to the bond that cement can make. Cementing on top of filter cake strips the cake off the walls and exterior surfaces due to the weight of the cement upon curing. This lack of direct adhesion creates fluid gaps in and permits circulation through the well bore annulus. Thus, the spacer fluid defined herein may be used to remove such compositions from the wellbore and thereby enhance bonding of the cement to surfaces in the wellbore.

EXAMPLES

All percentages set forth in the Examples are given in terms of by weight (unless otherwise noted) based on the total weight of the spacer fluid.

Examples 1-9

Spacer fluids were prepared by mixing 12, 10.5, and 9.2 lb/bbl of spacer fluid of a biodegradable polysaccharide gellant and 0.1 gal/bbl of spacer fluid of an antifoaming agent at density 13, 16, and 18 ppg, respectively. Barite was then added to the aqueous fluid at an amount sufficient to raise the density of the fluid. To the resulting fluid was then added hydroxyethyl cellulose (HEC) having a particle size distribution such that a minimum of 90% of the particulates are retained on a 20 mesh screen. Rheology testing was conducted at ambient and elevated temperatures (measured on a Model 35 Fann viscometer having a R1B1 rotor and bob assembly rotating at 300 rpm). The results are set forth in Table I.

Dynamic settling testing was performed in accordance with the thickening time procedure of API RP 10B-2 second edition, April 2013, but using a blade-less paddle having a base for collecting any settling solids. The testing was performed in a high pressure consistometer having adjustable motor speed control. The fluid was placed in a cup which was equipped with a dynamic settling paddle. The paddle may be prepared by first removing the internal horizontal blades from a standard API paddle and attaching a round flat plate above the remaining horizontal blades of the paddle to collect the solids settling dynamically from the fluid. The cup with the dynamic settling paddle was then placed into a consistometer having a variable speed drive capable of rotating at speeds of 150 rpm and 25 rpm.

The fluid was then brought to the desired bottomhole circulating temperature (BHCT) of 300° F. or 400° F. and pressure conditions using a thickening time while stirring at 150 rpm. This ensures stabilization of the fluid and the equipment at these conditions. Once the fluid was stabilized at the BHCT and BHP, the rotation speed of the consistometer was reduced to 25 rpm while maintaining the temperature and pressure for about 30 minutes. Rotation at the low rpm proceeds for at least 30 minutes. The consistometer was then cooled as quickly as possible until a safe temperature was reached to remove the cup (190° F. or less) and pressure was released. The cup was then removed from the consistometer without inverting it and the condition of the fluid was noted. The top ⅓ of the fluid was then poured into a beaker. The density of the top ⅓ portion of the fluid was then determined from the volume of the fluid and its weight. The densities of the middle and bottom third portions of the fluid were similarly determined. After all of the fluid had been poured, the paddle was removed from the cup. The height and condition of the cone of settled solids lying on the top of the plate was then noted. A vertical section was cut off of the cone of solids with a spatula, parallel to the vertical bars of the paddle. The conditions of the solids inside the cone were then noted. Characteristics of the cone are determinative of a fluid exhibiting the requisite stability. A fully non-settling fluid will form a cone on the bottom plate of the paddle (zero cone height). The maximum cone height that is considered allowable is about 0.5 inches. The results are shown in Table I below.

TABLE I

| Ex. No. | Density ppg | HEC ppb | Cone Height @300° F. Inch | Rheology @ Ambient 3/6/30/60/100/200/300 RPM (Fann degree) |
|---|---|---|---|---|
| 1 | 13 | 0 | 1 | 5/7/14/20/27/41/51 |
| 2 | 13 | 6 | 0.4 | 10/15/20/28/38/57/71 |
| 3 | 13 | 8 | 0.4 | 43/47/53/67/74/96/112 |
| 4 | 16 | 0 | 0.75 | 13/17/36/51/69/106/138 |
| 5 | 16 | 6 | 0.4 | 40/44/56/77/104/150/189 |
| 6 | 16 | 8 | 0.25 | 32/49/64/87/114/168/210 |
| 7 | 18 | 0 | 1.5 | 39/50/88/115/144/205/256 |
| 8 | 18 | 4 | 0.6 | 43/67/101/141/182/268/340 |
| 9 | 18 | 6 | 0.4 | 46/57/101/139/181/265/342 |

Table II illustrates the effect of the coarse HEC and temperature on cone height

TABLE II

| Density ppg | Suspending Material ppb | Cone Height inch |
|---|---|---|
| 16 | 0 | 0.75 @ 300° F. |
| 16 | 6 | 0.4 @ 300° F. |
| 16 | 12 | 0.25 @ 400° F. |

Table III illustrates a similar spacer fluid having a density of 16 ppg without a weighting agent.

TABLE III

| Suspending Material (ppb) | Viscosity at 3 RPM (cP) |
|---|---|
| 0 | 176 @ 300° F. |
| 6 | 383 @ 300° F. |
| 0 | 110 @ 400° F. |
| 12 | 270 @ 400° F. |

The Examples illustrate the stability of the spacer fluid disclosed herein even at elevated downhole temperatures.

What is claimed is:

1. A method of separating an aqueous cement slurry from a drilling mud during a cementing operation in a wellbore, the method comprising:
   (a) introducing into the wellbore a spacer fluid comprising particulates of a hydratable polymeric viscosifying agent having a particle size distribution such that a minimum of 90% of the particulates are retained on a 20 mesh screen, wherein the spacer fluid is introduced into the wellbore after introducing the drilling mud into the wellbore and before introducing the aqueous cement slurry into the wellbore and wherein the spacer fluid prevents contact between the drilling mud and the cement slurry;
   (b) displacing at least a portion of the drilling mud from the wellbore and emplacing the cement slurry in the displaced area; and
   (c) curing the cement slurry wherein the temperature within the bottom hole temperature of the wellbore is 300° F. or higher.

2. The method of claim 1, wherein the hydratable polymeric viscosifying agent of the spacer fluid is selected from the group consisting of a cellulosic derivative, a polyvinyl alcohol or an ammonium or alkali metal salt of an acrylamidomethylpropanesulfonic acid and mixtures thereof.

3. The method of claim 2, wherein the hydratable polymeric viscosifying agent of the spacer fluid is a cellulosic derivative.

4. The method of claim 3, wherein the cellulosic derivative is selected from the group consisting of hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

5. The method of claim 1, wherein the spacer fluid further comprises a weighting agent, a suspending agent or a combination thereof.

6. A method of emplacing an aqueous cement slurry into a wellbore containing a drilling mud, which comprises:
    (a) introducing a spacer fluid comprising particulates of a hydratable polymeric viscosifying agent having a particle size distribution such that a minimum of 90% of the particulates are retained on a 20 mesh screen into the wellbore containing the drilling mud, wherein the spacer fluid is introduced into the wellbore prior to introducing the aqueous cement slurry into the wellbore;
    (b) displacing at least a portion of the drilling mud having gelled and solid remnants within from an area in the wellbore into which the cement slurry is to be emplaced with the spacer fluid;
    (c) introducing into the wellbore the aqueous cement slurry, displacing at least a portion of the spacer fluid from the area in the wellbore with the aqueous cement slurry fluid and isolating the drilling mud from the aqueous cement slurry with the spacer fluid; and
    (d) permitting the aqueous cement slurry to harden.

7. The method of claim 6, wherein the hydratable polymeric viscosifying agent is selected from the group consisting of a cellulosic derivative, a polyvinyl alcohol or an ammonium or alkali metal salt of an acrylamidomethylpropanesulfonic acid and mixtures thereof.

8. The method of claim 7, wherein the cellulosic derivative is selected from the group consisting of hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

9. The method of claim 8, wherein the hydratable polymeric viscosifying agent of the spacer fluid is hydroxyethyl cellulose.

10. The method of claim 6, wherein the bottom hole temperature of the wellbore is 400° F. or higher.

11. The method of claim 6, wherein the density of the spacer fluid is at least equal to or greater than the density of the drilling mud and less than or equal to the density of the cementitious slurry.

12. A method of displacing at least a portion of a first fluid from a wellbore annulus wherein the annulus is between an external surface of a tubing within the wellbore and a face of a subterranean formation penetrated by the wellbore, the method comprising:
    (a) pumping into the wellbore a second fluid, prior to pumping a cementitious slurry into the slurry, the second fluid comprising particulates of a hydratable polymeric viscosifying agent having a particle size distribution such that a minimum of 90% of the particulates are retained on a 20 mesh screen, wherein the second fluid is pumped down the wellbore and up through the annulus and further wherein viscosification is delayed in the annulus by inclusion of the hydratable polymeric viscosifying agent in the second fluid;
    (b) inducing laminar fluid circulation of the first fluid;
    (c) pumping, after step (b), the cementitious slurry into the wellbore and up through the annulus wherein the second fluid isolates the first fluid and the cementitious slurry; and
    (d) displacing at least a portion of the first fluid from the annulus with the cementitious slurry; and
    (e) curing the cementitious slurry emplaced in the annulus by the removal of the first fluid.

13. The method of claim 12, wherein the hydratable polymeric viscosifying agent is selected from the group consisting of a cellulosic derivative, a polyvinyl alcohol or an ammonium or alkali metal salt of an acrylamidomethylpropanesulfonic acid and mixtures thereof.

14. The method of claim 13, wherein the hydratable polymeric viscosifying agent is a cellulosic derivative.

15. The method of claim 14, wherein the cellulosic derivative is selected from the group consisting of hydroxyethyl cellulose, methylhydroxyethyl cellulose, hydroxyethylmethyl cellulose, ethylhydroxyethyl cellulose, ethylmethylhydroxyethyl cellulose, hydroxypropyl cellulose, hydroxyethylpropyl cellulose, dialkyl carboxymethyl cellulose, carboxymethylhydroxyethyl cellulose and carboxymethyl cellulose and mixtures thereof.

16. The method of claim 15, wherein the hydratable polymeric viscosifying agent is hydroxyethyl cellulose.

17. The method of claim 12, wherein the second fluid further comprises a weighting agent.

18. The method of claim 17, wherein the weighting agent is selected from the group consisting of sand, barite, hematite, fly ash, calcium carbonate, silica sand, ilmenite, manganese oxide, trimanganese tetraoxide, iron oxide and mixtures thereof.

19. The method of claim 18, wherein the weighting agent is barite.

20. The method of claim 12, wherein the well is a horizontal well.

* * * * *